Sept. 5, 1933.   R. MAYNE   1,925,904
METHOD AND APPARATUS FOR GAUGING SHEET MATERIAL
Filed Nov. 24, 1928   2 Sheets-Sheet 1
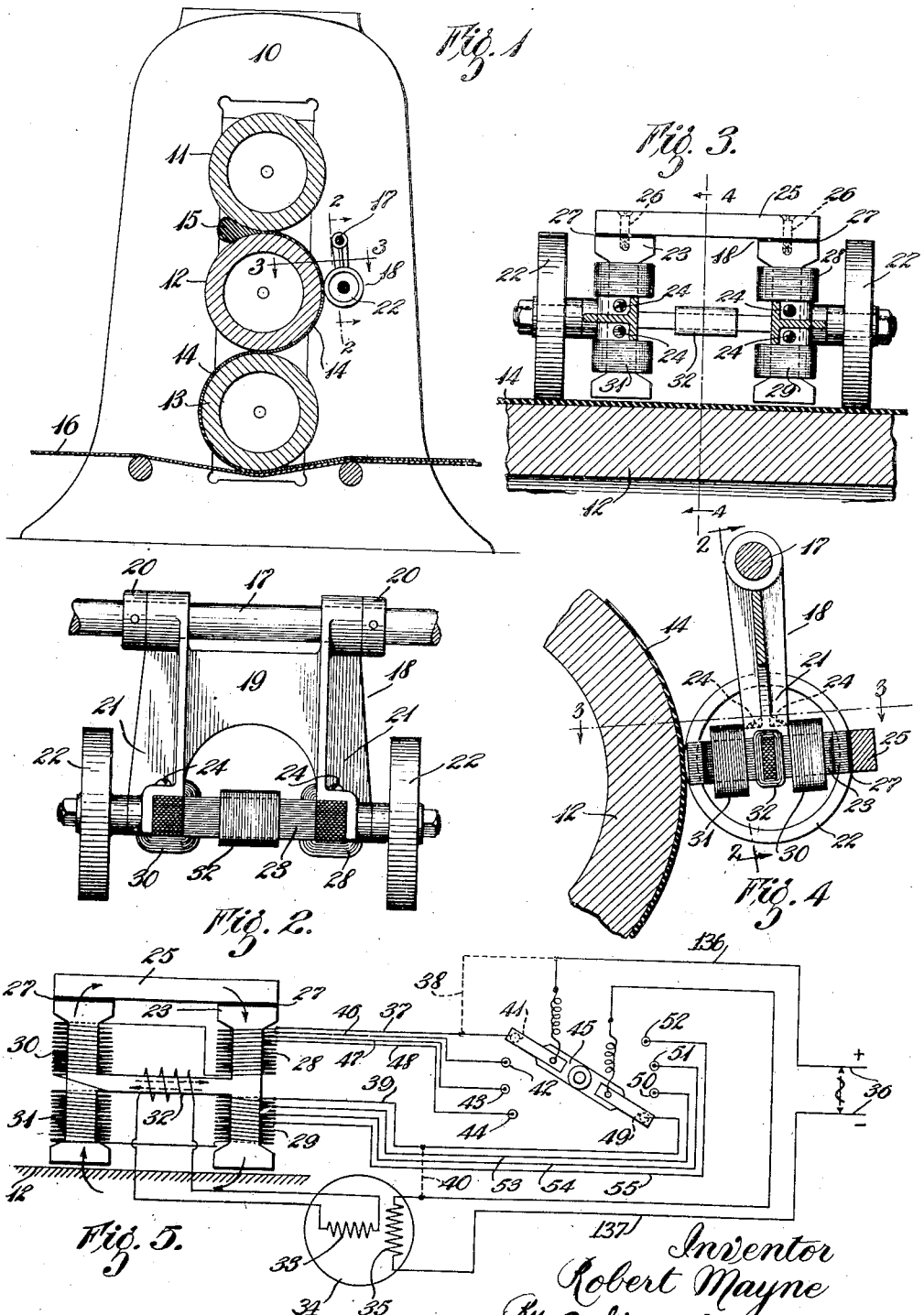

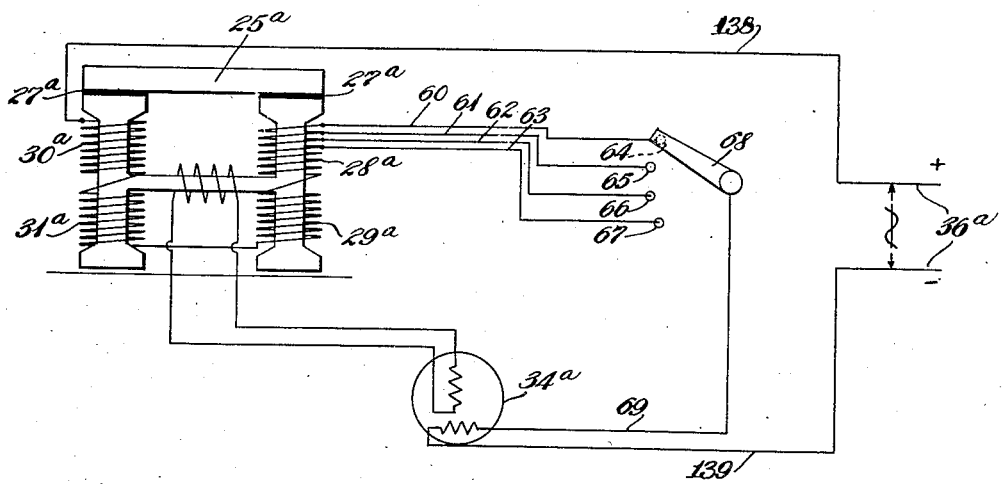
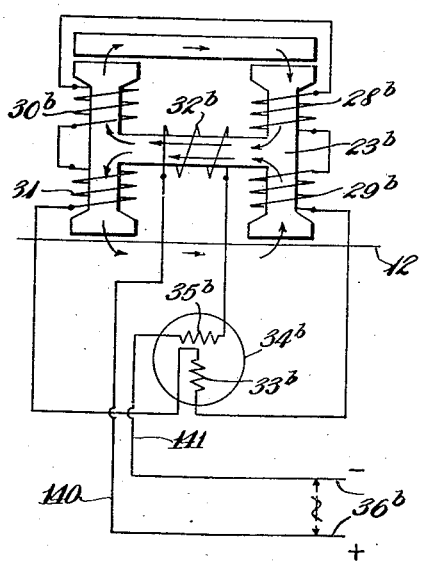
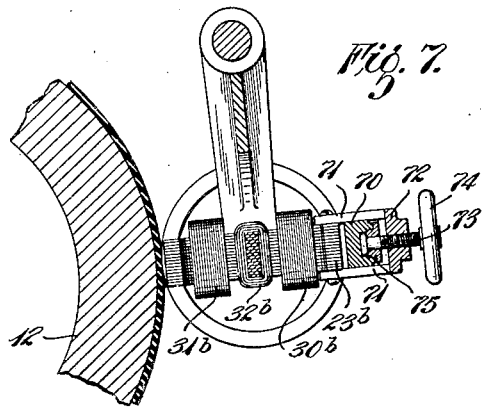

Patented Sept. 5, 1933

1,925,904

UNITED STATES PATENT OFFICE 1,925,904

METHOD AND APPARATUS FOR GAUGING SHEET MATERIAL

Robert Mayne, Akron, Ohio, assignor to The B. F. Goodrich Company, New York, N. Y., a corporation of New York Application November 24, 1928
Serial No. 321,625

5 Claims. (Cl. 177—351)

This invention relates to methods and apparatus for gauging sheet material, and especially it relates to procedure and apparatus for detecting variations of thickness in a moving sheet of plastic material, for example, a sheet of unvulcanized rubber composition, as the same is continuously delivered from a rubber-working calender.

The chief objects of my invention are to provide a gauge of the character described which will be extremely sensitive to variations of stock thickness, and which easily may be maintained in a condition of uniform sensitivity. Another object is simplicity of structure.

Briefly stated, my invention comprises an electro-magnetic gauge which utilizes magnetic flux instead of electric current as a medium for inducing electric current in a circuit which includes a recording or calibrating device, by means of which variation of the reluctance of the magnetic circuit, caused by variation in thickness of a sheet of material, is indicated or recorded, or is utilized for correcting the adjustment of the sheet producing means.

Of the accompanying drawings:

Fig. 1 is a vertical section of a sheeting calender and my improved gauging apparatus, in its preferred form, associated therewith.

Fig. 2 is a section on line 2—2 of Fig. 1 and Fig. 4.

Fig. 3 is a section on line 3—3 of Fig. 1.

Fig. 4 is a section on line 4—4 of Fig. 3.

Fig. 5 is a wiring diagram of my preferred form of gauging apparatus.

Fig. 6 is a modified wiring diagram of my preferred gauging apparatus.

Fig. 7 is a modified form of gauging apparatus.

Fig. 8 is a wiring diagram of my modified form of gauging apparatus.

Referring to the drawings, 10 is an end frame and 11, 12, and 13 are respective upper, middle, and lower rolls of a three-roll calender of usual design adapted to form a sheet of material 14 upon the roll 12 from a bank of plastic material 15 in the bight of the rolls 11, 12, and to deliver said sheet onto a moving conveyor or liner 16 passing beneath the lower roll 13. A horizontal rod 17 disposed parallel to the calender rolls is supported from its ends upon the calender frames 10, and pivotally suspended from the rod 17 is a gauging apparatus designated generally by the numeral 18, the position of the rod 17 with relation to the roll 12 being such that the gauging apparatus rests lightly against the plastic sheet 14 upon said roll.

The gauging apparatus 18 comprises a frame 19 journaled at its upper end upon the rod 17 between two positioning collars 20, 20, and having its lower end formed with spaced apart leg-portions 21, 21, upon which are journaled respective wheels 22, 22, adapted to rest against the sheet 14 on the roll 12.

The frame 19 supports a magnetic gauging device comprising a laminated, H-shaped, steel core member 23 secured to the respective leg members 21 by screws 24, 24, and so positioned thereupon that it normally is disposed radially with relation to the roll 12 with the flat faces at one end of its parallel portions lying closely adjacent but not touching the sheet 14 on said roll. The other ends of said parallel portions of the core are connected to each other by an armature 25 of magnetic material secured thereto by screws 26, 26 of non-magnetic material such as brass, spacing-blocks or shims 27, 27 of non-magnetic and preferably non-conductive material being interposed between the armature and the respective core portions. The thickness of the spacing blocks is substantially the same as the gap between the surface of the calender-roll 12 and the adjacent portions of the core. The transverse portion of the H-shaped core 23 is of smaller cross-sectional area than the parallel portions of the core, and the end portions of the latter preferably are larger than their intermediate portions, as shown, for purposes subsequently to be described.

The wiring of the core 23 will best be understood by reference to Fig. 5 wherein 28 and 29 are wire coils wound upon one of the parallel portions of the core 23 at each side of the transverse portion thereof, and 30, 31 are similar wire coils wound upon the other parallel portion of said core, said coils being interconnected in series as shown. The coils 30, 31 are not essential to the operation of the device but are desirable because they provide a balanced structure. A wire coil 32 is wound on the transverse portion of the core 23 and is connected with one coil 33 of an A. C. galvanometer or wattmeter 34 which may be positioned at a point remote from the calender. In the simplest embodiment of my invention, the other coil 35 of the galvanometer, which is the exciting coil, together with the coils 28, 29, 30 and 31 of the core 23, are connected in series across an A. C. supply line 36, the circuit being completed from the upper side of the supply line 36 through leads 136, 38 and 37, coils 28, 30, 31 and 29 in series, leads 39 and 40, coil 35 and lead 137 to the lower side of supply line 36.

In the operation of the apparatus, the circuit is energized and a test-piece of correct thickness and of the material to be gauged is mounted between the calender roll 12 and the gauging device 18 to serve as a standard for adjusting the latter. The correct adjustment of the device produces a zero reading on the galvanometer, and an incorrect adjustment reads either way therefrom, which condition is said to be unbalanced. If unbalanced, the circuit is brought to balanced condition by adding to or reducing the thickness of the shims 27, which will alter the length of the gaps between the armature 25 and the core 23. The calender may then be started and the sheet material 14 passed beneath the gauge 18, the galvanometer 34 registering any variation in the thickness of said sheet from the standard to which the gauge is adjusted.

The action of the forces within the gauge is as follows. The coils 28, 29, 30, and 31 are so wound and arranged that when energized they produce magnetomotive force (M. M. F.) which is cumulative and of the same direction, with the result that a flux is caused to flow in a path defined by the parallel portions of core 23, the calender roll 12, the armature 25, and across the gaps between the core and the calender roll and between the core and the armature. If the ratio of the M. M. F. of the coils 28, 30 to the reluctance of the gaps between the core 23 and the armature 25 is equal to the ratio of the M. M. F. of the coils 29, 31 to the reluctance of the gaps between the core 23 and the calender roll 12, and assuming that the reluctance of the iron path is negligible as compared with the reluctance of the gaps, then the two ends of the core 23 will be of the same magnetic potential and no flux will flow through the transverse portion of the core. This condition is said to be balanced and gives a zero reading on the galvanometer.

If the thickness of the sheet 14 varies from the standard to which the gauge is balanced, then the two ratios referred to in the foregoing paragraph will be different, flux will flow through the transverse portion of the core 23, and an electrical current will be induced in the coil 32 which current will deflect the indicator of the galvanometer either way from zero according as the sheet 14 is over or under the desired thickness.

Let us consider the action of the gauge at a particular instant, say when conditions are balanced, and current in the coils is flowing in the direction indicated by the polarity of the supply-line 36 and is decreasing. Then flux will flow through the core following the course indicated by the full-line arrows of Fig. 5. If the sheet material 14 runs below the desired thickness flux will flow in the transverse portion of the core 23 in the direction of the broken line arrow pointing to the right and current will be induced in the coil 32 and be so recorded by the indicator of the galvanometer. If the sheet material 14 runs oversize the flux in the transverse portion of the core will flow in the opposite direction as indicated by the reversed arrow and induce a current to flow through the coil 33 of the galvanometer in the opposite direction from the preceding case, and thus cause the galvanometer to register an oversize condition of the sheet.

The relatively small cross-section of the transverse portion of the core 23 limits the induced current flowing to the galvanometer to a safe value to prevent damage to the galvanometer coil when the gauge is lifted from the work while energized.

The gauge is adapted to operate upon stock of any thickness and always can be brought to balanced condition either by the aforementioned method of varying the reluctance of the gaps between the coil 23 and armature 25, or by my preferred method of varying the M. M. F. of one of the coils of the core with relation to a coil on the other side of the transverse portion thereof. The latter method may be carried out by varying the number of turns of one of the coils with relation to the other by means of a dial switch, suitable circuits for effecting such adjustment being shown in Figs. 5 and 6 of the drawings.

The preferred method of balancing the gauge by means of a dial switch is illustrated in Fig. 5 wherein the leads 38 and 40 are eliminated, and the lead 37 carried to contact 41 of one of a series of contacts 41, 42, 43, and 44 of a two-blade dial switch 45. Taps 46, 47, and 48 taken from successive turns of the windings of the coil 28 are carried to the contacts 42, 43, and 44 respectively. The dial switch is provided with a second series of contacts 49, 50, 51, 52 connected respectively to the lead 39 and to taps 53, 54, and 55 taken from alternate turns of the windings of the coil 29 immediately at one side of the lead 39. One blade of the switch 45 is adapted to make contact with the contacts 41, 42, 43 and 44 and is connected to one side of the A. C. supply line 36. The other blade of the switch 45 is adapted to make contact with the contacts 49, 50, 51, and 52 and is connected to that side of the coil 35 of the galvanometer 34 which is connected to the lead 40 in the simpler form of the circuit.

The arrangement is such that when the blades of the switch are on the contacts 41, 49 the turns of wire utilized in the coils 28, 29 are of equal number. When said blades are on the contacts 42, 50 there is a differential of one turn in favor of coil 28. In like manner the other positions of the switch blades increase the differential of turns in the coils 28, 29 so that the latter will produce different magnetic potentials to offset the different reluctances of the gaps between the core 23 and calender roll and the core and armature when stocks of various thicknesses are to be gauged. This circuit has the advantage over the balancing method embodying changes of shims in that the adjusting means may be more conveniently situated, remote from the calender, and adjustment is more easily and quickly effected. This circuit also provides constant uniform sensitivity in the gauge by varying the flux to compensate for variations in the length of the air gap between the core and calender, since variations in the length of said air gap normally would vary the sensitivity of the gauge.

The gauge rests lightly against the work and magnetic pull on the gauge, toward the calender roll, is reduced by the provision of the enlarged end portions on the core-legs adjacent the work, since magnetic pull for a given flux is inversely proportional to the area of the air-gap. The enlarged portions on the opposite ends of the core-legs are to provide uniformity of structure only.

The modified circuit shown in Fig. 6 is of simpler construction than that shown in Fig. 5 and provides the same advantages of remote control and easy adjustment as the latter, but does not provide constant uniform sensitivity.

In the circuit shown in Fig. 6, considering one instantaneous condition, the positive side of the supply line $36^a$ is connected through lead 138 to the coil $30^a$ and the latter connected in series with coils $31^a$, $29^a$, and $28^a$, and taps 60, 61, 62, and 63 are taken from the final turns of the latter and connected respectively to contacts 64, 65, 66 and 67 of a single-blade dial-switch, the blade 68 of which is connected by the lead 69 to the field or exciting coil of an A. C. galvanometer $34^a$, the other side of said coil being connected through lead 139 to the negative side of the supply-line $36^a$. It will be obvious that the number of taps taken from the coil $28^a$ may be greater or fewer than the number shown according to the requirements of the installation.

The arrangement is such that the number of turns in the coil $28^a$ may be varied to vary the magnetomotive force of the coil $28^a$ to compensate for the different reluctances in the magnetic path occurring when a stock of different thickness is calendered and gauged.

The modified gauge shown in Fig. 7 is substantially of the same construction as the preferred structure shown in Figs. 1 to 4 inclusive, except that it is provided with a compensating armature 70 standing clear of the core $23^b$ and provided with means by which said armature may be moved toward and away from the core to vary the length of the gaps between said armature and the ends of the parallel portions of the core.

Mounted upon opposite sides of the parallel portions of the core $23^b$, at their ends which are remote from the work, are outstanding brackets such as the brackets 71, 71 of Fig. 7, said brackets being connected by a cross piece 72 through the middle of which is threaded a screw 73. The outer end of the latter is provided with a hand-wheel 74, and its inner end is formed with an enlarged flange or bead revolubly seated in a complemental recess in the armature 70 and retained therein by a threaded cap 75. The end portions of the armature are positioned between the respective pairs of brackets 71, 71 which serve as guides to prevent angular movement of the armature during periods of adjustment. The armature is made of magnetic material, and the brackets 71, cross-piece 72 and armature-adjusting mechanism preferably are of non-magnetic material.

The arrangement is such that the length of the gaps between the armature and core may be quickly, easily, and uniformly altered to bring the gauge to balanced condition, without the inconvenience of removing the armature, and without the use of spacing shims.

The wiring of the modified gauge shown in Fig. 7 may be slightly different from the wiring of the preferred form. As shown in Fig. 8, the coil $32^b$ on the transverse bar of the armature $23^b$ is the exciting coil of the device, one side of said coil being connected through lead 140 to the positive side of the supply-line $36^b$, considering one instantaneous condition, and the other side of said coil being connected in series with one side of the field-coil $35^b$ of the galvanometer $34^b$, the other side of said field coil $35^b$ being connected through lead 141 to the negative side of the supply-line $36^b$. Coils $28^b$, $29^b$, $30^b$ and $31^b$ are wound on the respective parallel portions of the core $23^b$ and connected in series to each other, and to the potential coil $33^b$ of the galvanometer $34^b$, as shown.

The arrangement is such that when the coil $32^b$ is energized, two courses of magnetic flux are established, one across the gaps between the armature and calender roll, through the calender roll, through the transverse portion of the core and through the intervening core structure, and another through the transverse portion of the core, through the armature 70, across the gaps between the latter and the core, and through the adjacent parallel portions of the core, both courses being indicated by arrows in Fig. 8. The result is that an alternating voltage is induced in the coils $28^b$, $29^b$, $30^b$, and $31^b$, and the cumulative voltages of the coils $28^b$, $30^b$, is in opposition to the cumulative voltages of coils $29^b$, $31^b$.

When the device is balanced, that is when the reluctance of the gaps between the calender roll 12 and the core $23^b$ is the same as the reluctance of the gaps between the calender roll 12 and the core $23^b$, then the flux divides equally in the two courses mentioned, and the resultant induced voltage is zero, and therefore no current flows in the circuit comprising the coils $28^b$, $29^b$, $30^b$, $31^b$ and the coil $33^b$ of the galvanometer. This gives a galvanometer dial-reading of zero.

When the reluctance of the gaps between the core and calender roll varies, due to changing thickness of the material being calendered, the flux does not divide equally and therefore induces a voltage in the coils $29^b$, $31^b$ which is greater or less than the voltage induced in the coils $28^b$, $30^b$, with the result that an electrical current, which is either approximately in phase or approximately 180 degrees out of phase with the main current, flows through the galvanometer coil $33^b$ and causes the indicator of the latter to deflect one way or the other from the neutral zero position.

Other modifications are possible within the scope of the appended claims, and I do not limit the claims to the exact procedure or specific construction shown and described.

I claim:

1. Apparatus for measuring the thickness of sheet material, the said apparatus comprising magnetic circuit means having a gap therein and a magnetic shunt across the gap, means for producing a flux in said circuit, means for varying the width of the gap according to variations in the thickness of the sheet material, and means including a coil associated with said shunt for manifesting variations of the flux therein resulting from the variations in the width of the gap.

2. Apparatus as defined in claim 1 in which the shunt is of such small magnetic conductivity as to avoid the induction of an electric current in the coil of such strength as to cause damage to the manifesting means.

3. Apparatus for measuring the thickness of sheet material, the said apparatus comprising magnetic circuit means having a gap therein and a magnetic shunt across the gap, means for passing the material through the gap, means for so producing a flux in said circuit that the flux through the shunt will approximate zero when the material is close to standard thickness, and means for manifesting variations of flux in the shunt resulting from variations in the thickness of the material.

4. Apparatus as defined in claim 3 including means for so modifying the flux-producing means as to compensate for variations in the size of the gap as to the amount of flux created in the shunt.

5. Apparatus for measuring the thickness of plastic sheet material, the said apparatus comprising a metal roll upon the surface of which the material is carried, a magnetic core assembly mounted to bear yieldingly against the material upon the roll, the said assembly including a core which with the metal roll constitutes a magnetic circuit having a gap which varies with the thickness of the sheet of material, the core having an enlarged end portion adjacent the roll of such large size as to avoid excessive magnetic pull of the said assembly toward the roll, means for producing a flux in the said circuit, and means for manifesting variations of the flux resulting from variations of the thickness of the material.

ROBERT MAYNE.